April 15, 1952  E. E. POWELL  2,592,821
FIXTURE FOR MACHINE TOOLS
Filed Aug. 11, 1945  3 Sheets-Sheet 1
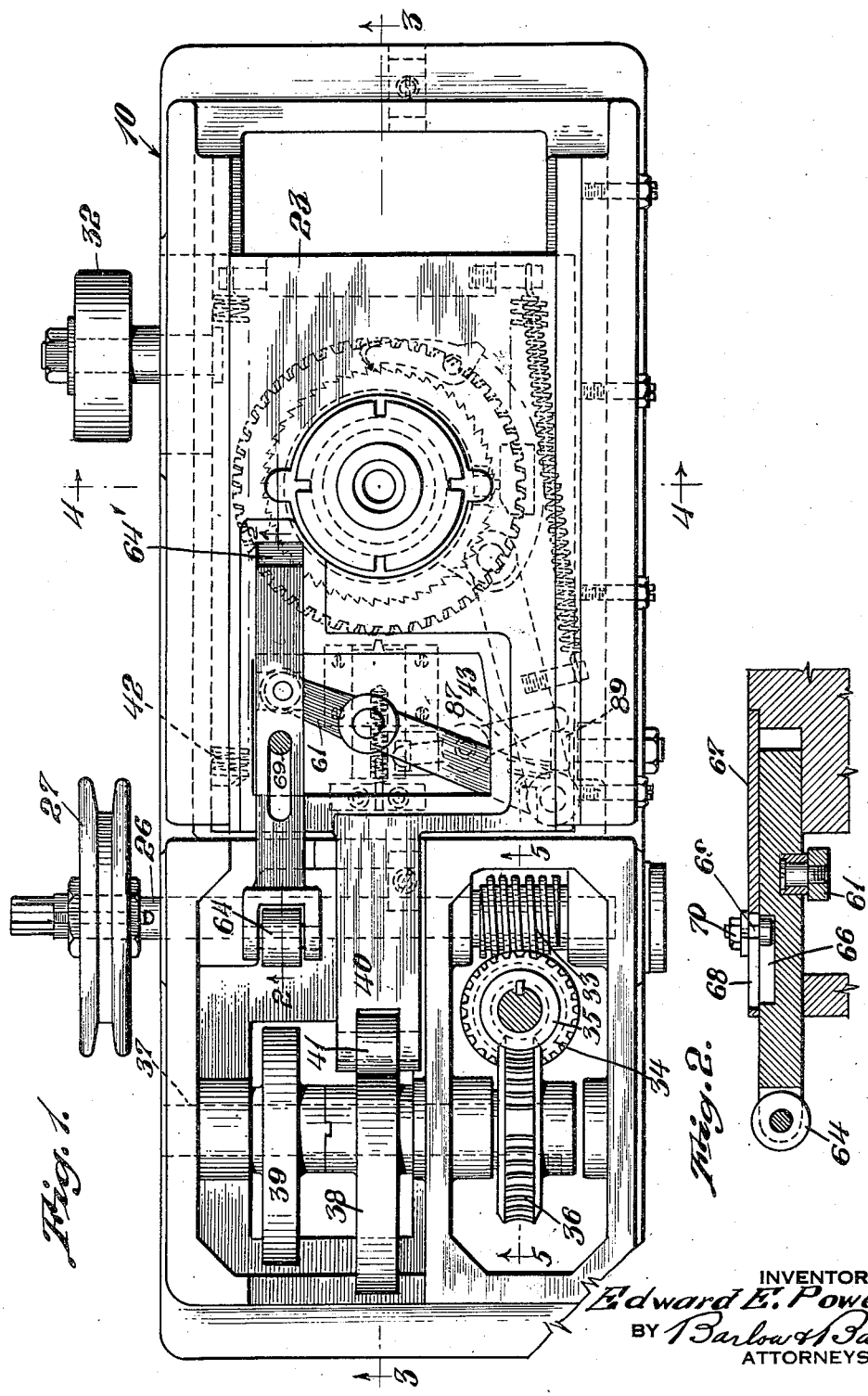
INVENTOR
Edward E. Powell
BY Barlow & Barlow
ATTORNEYS

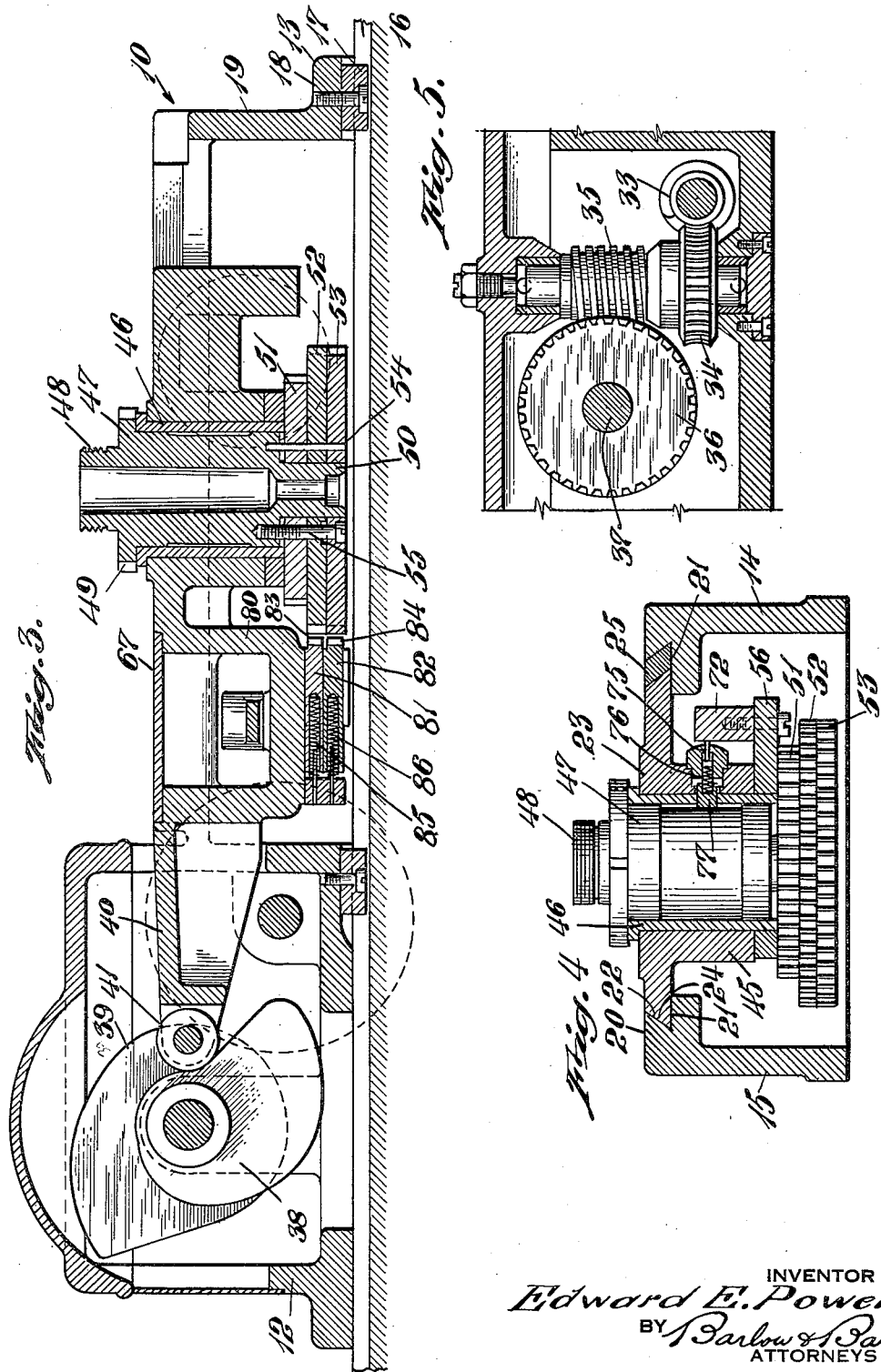

April 15, 1952     E. E. POWELL     2,592,821
FIXTURE FOR MACHINE TOOLS
Filed Aug. 11, 1945     3 Sheets-Sheet 3
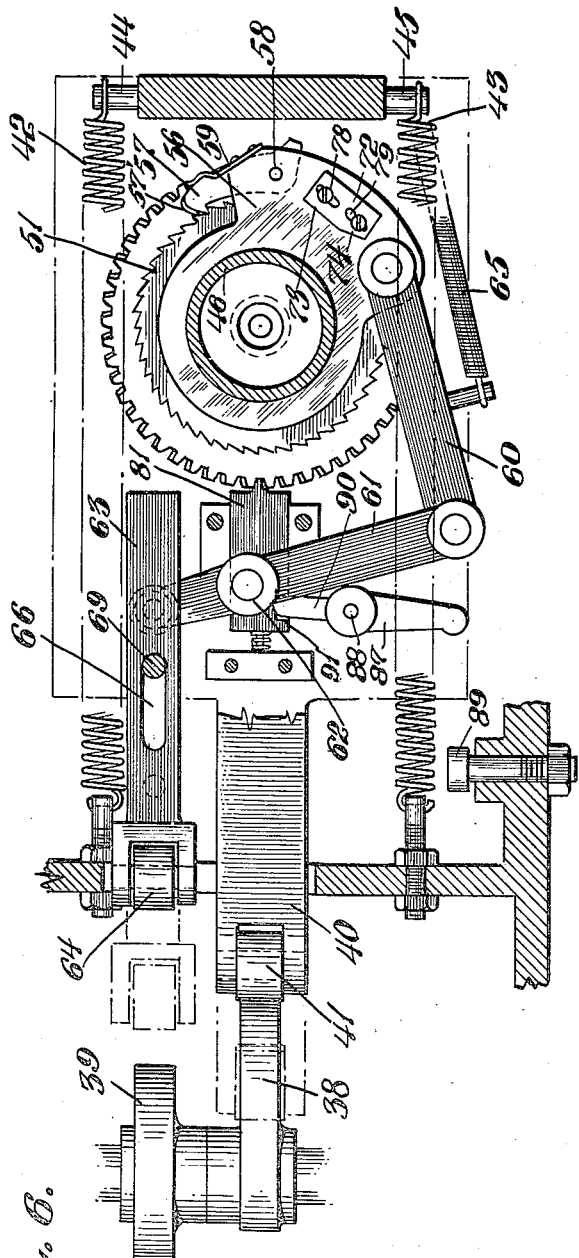
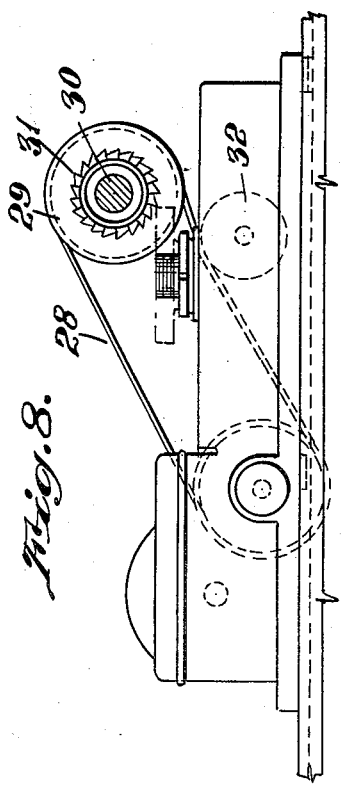
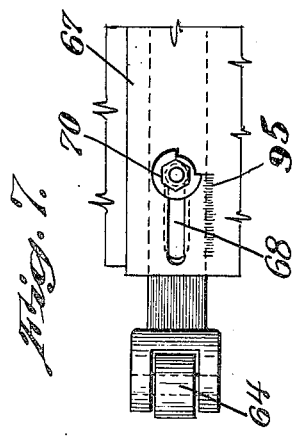
INVENTOR
Edward E. Powell
BY Barlow & Barlow
ATTORNEYS Patented Apr. 15, 1952

2,592,821

UNITED STATES PATENT OFFICE 2,592,821

FIXTURE FOR MACHINE TOOLS

Edward E. Powell, Conimicut, R. I.

Application August 11, 1945, Serial No. 610,268

12 Claims. (Cl. 90—56)

This invention relates to a work holding fixture which may be used in connection with a machine tool and is particularly adapted to effect an indexing and feeding movement of a work piece relative to a cutting tool.

A work piece which must be indexed in its machining operation usually requires that an elaborate expensive machine be used for operation on the work piece. Some fixtures have been attempted which may be attached to machine tools, but the indexing depends upon the reciprocating movement of the work piece toward and from the tool. A device which operates in this manner has definite limitations as to the indexing which may be effected, and it is dependent upon movements which are undesirable.

One of the objects of this invention is to provide a work holding fixture which will be a complete unit and which may be driven from any suitable driving mechanism.

Another object of this invention is to provide a unit which will be wholly automatic in its operation.

Another object of this invention is to provide a unit in which the indexing of the work will take place independent of the movement of the work toward and from the cutter or tool which operates on the work.

Another object of this invention is to provide a unit which will be complete within itself and which will not be dependent upon the movement of any part of the machine upon which it is mounted.

Another object of this invention is to provide an indexing unit which may have a greater variety of movements possible than were the indexing mechanisms built into the machine such as provided in a previously known manner.

Another object of this invention is to provide a fixture which may be mounted upon any machine tool table.

Another object of this invention is to provide a device which will not be dependent upon the stroke of the carrier for the work in its movement toward and from the operating tool, and thus one which will not sacrifice any of the stroke of the carrier for doing some other part of the work in the mechanism.

Another object of the invention is to provide a locking mechanism which will be strong and yet productive of a large number of positions in which it may be locked in angular rotation.

With these and other objects in view, the invention consists of certain novel features of construction, as will be more fully described and particularly pointed out in the appended claims.

In the accompanying drawings:

Fig. 1 is a top plan view of the fixture with parts broken away for more clearly viewing the inner working parts.

Fig. 2 is a sectional view taken through the cam follower which is carried by the reciprocating work carrier.

Fig. 3 is a central sectional view on substantially line 3—3 of Fig. 1.

Fig. 4 is a sectional view on substantially line 4—4 of Fig. 1.

Fig. 5 is a sectional view on substantially line 5—5 of Fig. 1.

Fig. 6 is a top plan view illustrating certain of the moving parts in order that their operation may be better understood.

Fig. 7 is a top plan view of a fragmental showing of Fig. 2.

Fig. 8 is an elevation illustrating the complete fixture as mounted on a fragmental showing of a table or other support and showing the drive from a tool arbor on which the tool is mounted, also illustrating in broken line the work as positioned upon the fixture.

In proceeding with this invention, I have provided a frame in which all of the moving parts are contained, a pulley being provided for operation of the drive shaft from some arbor such as the tool arbor of a machine tool or other arbor upon which the tool which is to operate upon the work is provided. A cam shaft serves to provide the actuation of a reciprocating carrier for the work and also serves to index the work when in a certain retracted position from the tool which operates upon the work. A brake is provided to hold the work while the pawl operates to take a new grip, and locking means are provided for locking the work definitely in an indexed position after it has been turned to such position. These locking means are automatically withdrawn at the time of index. Adjustments are provided so various amounts of indexing are provided. The mechanism is such that it may be locked in a large number of positions of indexing so that very fine work may be done on the machine.

With reference to the drawings, 10 designates a frame, which may be rectangular, having ends 11 and 12 which are connected to side walls 14, 15, all of which are provided with flanges 13 to be secured to a support 16 by some means such as shoe 17 and bolt. A top wall 20 (see Fig. 4) is provided with slideways 21, undercut as at 22, for the reception of a work carrier 23, which has an edge 24 to fit the slideway 22 on one side, and is provided with an adjustable edge 25 to fit the slideway 21 on the other side. This work carrier has mounted upon it most of the operating parts of the mechanism.

A main actuating shaft 26 extends laterally of the fixture and is rotatable in bearings and driven from a pulley 27, which, as shown in Fig. 8, is driven by reason of belt 28, circling this pulley 27 and also engaging a driving pulley 29 on the arbor 30 which carries the work cutter or tool 31. This belt 28 is trained over an idler 32, also mounted on the frame of this fixture. The main drive shaft 26 has a worm 33 thereon (see Fig. 1) which drives the worm gear 34, which in turn drives the worm 35 and in turn drives the worm wheel 36, as shown in Fig. 5. The worm gear 36 is mounted on the cam shaft 37 which extends laterally of the machine and carries cams 38 and 39 for performing certain actuating functions.

The work carrier 23 has an arm 40 having a cam follower 41, mounted in one end thereof, which is in a position to engage the cam 38. The springs 42 and 43 attached to the frame and engaging ends 44 and 45 secured to the work carrier 23, urge the carrier toward the left as shown in Figs. 1, 3, and 6 so as to cause the cam follower 41 to engage the cam 38. As the cam rotates, the work carrier will be moved to the right, as shown in Figs. 1, 3, and 6, while the springs will return the carrier, moving it toward the left. Thus the reciprocating movement of the carrier is provided.

A vertically extending boss 45 (see Fig. 4) receives a bushing 46 in which there is rotatably mounted a mandrel 47 which is flanged with notches therein and is reduced as at 48 and threaded. Different collars for mounting the work are screwed onto this reduced portion 48 and suitably held in position. Collars of different diameters may be provided for work of varying diameters.

The lower end of the mandrel 47 is reduced as at 50 (see Fig. 3) upon which there is mounted a ratchet wheel 51 (see Figs. 3, 4) and a gear wheel 52, and a second duplicate gear wheel 53. These gear wheels, 51, 52, and 53, are all locked to each other and to the mandrel 47 by a pin 54 and also by a securing bolt 55 which extends through all of them and fastens into the mandrel. The gears 52 and 53, although of duplicate construction, are so arranged that the teeth of the gear 52 will be opposite the recesses in the gear 53, and vice versa, as shown more particularly in Fig. 4.

A plate 56 is rockably mounted on that portion of the bushing 46 which extends below the boss 45. This plate carries pawls 57 and 57', pivoted as at 58, and urged inwardly by a spring 59 so as to engage the teeth of the ratchet 51. The pawls 57, 57' are of unequal length by one half a tooth to enable more accurate adjustment. Plate 56 is connected by link 60 to a lever 61, pivoted as at 62, and connected to the cam follower slide 63, which is slidably mounted in recess 64' (see Fig. 1) of the carrier 23. This slide 63 has rotatably mounted on it a cam follower 64 to be engaged by the cam 39. A spring 65, attached to the link 60, rocks the lever 61 counterclockwise as shown in Figs. 1 and 6, tending to move the slides 63 to the left as shown in these figures. A slot 66 is provided in this slide 63 and the cover 67 (see Figs. 2, 3, and 7) also has a slot 68 for slidably mounting a pin 69 therein in any adjusted position by reason of the nut 70. This pin 69 will limit the movement of the slide 63 and thus limit the number of teeth that the pawls 57 or 57' will pick up when the plate 56 is moved counterclockwise as shown in Fig. 6. It will be readily apparent that when the slide is moved to the right as shown in Figs. 1 and 6, by the cam 39 when it engages the follower 64 the lever 61 will be rocked to move the plate 56 clockwise, and, by reason of the pawls, 57 or 57' engaging the ratchet 51, the mandrel will be rotated in a predetermined amount dependent upon the adjustment of the pin 69.

The plate 56 carries an upstanding cam 72, having an actuating surface 73 and cam surface 74 for engaging and urging inwardly the pin 75, which, through spring 76, presses a shoe 77 against the mandrel 47 to apply friction thereto. This cam 72 is attached to the plate 56 by screws 78 extending through slots 79 so that the cam may be adjusted on this plate. The surface 73 will engage the pin to apply maximum pressure to the mandrel as the pawls are moving counterclockwise to take a new grip. The resiliency, however, will permit of positive movement of the ratchet wheel by the pawl action just above explained. In some cases, it may not be necessary to have a brake such as heretofore described.

The work carrier 23 extends downwardly as at 80 (see Fig. 3) for the reception of the lever 61 and below this downwardly extending portion, blocks 81 and 82 are provided, carrying locking fingers 83 and 84 which are pressed by springs 85 and 86 to cause these fingers to enter one of the spaces between teeth of the gears with which they are aligned. If one gear is in registry with its locking finger, it will be apparent that the other one is out of registry with its locking finger, and thus this finger will engage one of the teeth instead of the space between the teeth. In order to withdraw these locks 81 and 82 I have provided a lever 87, pivoted as at 88, and located in the path of movement of an abutment 89 (see Fig. 1) mounted on the carriage or carrier 23. Thus, as the carriage 23 moves toward the cam shaft, this block 89 will engage the lever 87 and swing the lever about its pivot. The levers have their other ends 90 entering recesses 91 in the blocks so as to withdraw the blocks from the gears, permitting indexing by the ratchet mechanism above described.

It will be readily apparent that the reciprocation of the carrier 23 upon which the work is mounted takes place by reason of the rotation of the cam 38 and is unaffected in its action by any other mechanism of the fixture. It will also be apparent that the stroke of the carrier assists in unlocking the work, but that the indexing is independent of the movement of the carrier by reason of the cam 39 engaging the slide which actuates the pawl, causing the rotation of the work which is mounted on the mandrel. A brake may or may not be necessary to retard the movement of the work during the return of the pawl for a new grip. The cover 67 is mounted in a location which is readily accessible from the top of the fixture and, by adjustment of the nut 70 to a position along the graduations 95 (see Fig. 7) on the cover, the angular rotation or amount of indexing may be readily adjusted.

By reason of a plurality of gears for locking the mandrel in place, I maintain the strength of large teeth, which is desirable, and by staggering the arrangement of the teeth and providing a plurality of locking plungers I am able to obtain a very fine angular amount of indexing, divided up into any desired number, which will be a multiplication of the teeth in any gear by the number of gears which are provided. For instance, in the particular showing here, I might have 40 teeth in each of the gears 52 and 53, and thus I would divide the 360 degrees angular rotation into 80 spaces by having two duplicate gears of 40 teeth each, and yet the strength of a 40-tooth gear is provided. In the case of the pawl and ratchet mechanism, one large ratchet having strong teeth is provided and two pawls 57, 57' or any multiple of pawls are provided, and these are so arranged as to divide the distance between the ratchet teeth into even divisions for dividing the angular rotation of the ratchet gear into increments less than the distance between teeth.

By changing the pitch of the worm mechanism, as for instance the pitch of the worm 33, I may vary the speed of the device. This worm may be made readily interchangeable, or the size of the pulley 27 might be changed to vary the speed throughout. It is readily apparent that the fixture is readily flexible for various speeds and functions and that it is extremely simple in its construction.

The fixture may be mounted upon any support adjacent a cutting tool and particularly may be mounted upon a machine tool, on the table thereof which will be maintained fixed, all movement being had by the fixture which is mounted thereon.

I claim:

1. A fixture for a machine tool comprising a frame adapted to be secured to a suitable support, a work carrier slidably mounted on said frame, a first cam means operable for reciprocating said carrier for feeding the work, and second cam means operable at the end of the return stroke of said carrier for indexing the work while said carrier is without movement.

2. A fixture for a machine tool as set forth in claim 1 wherein means are provided for locking the work in position after indexing.

3. A fixture for a machine tool as set forth in claim 1 wherein said indexing means comprise a pawl and ratchet.

4. A fixture for a machine tool as set forth in claim 1 wherein said indexing means comprise a pawl and ratchet and actuating cam.

5. A fixture for a machine tool as set forth in claim 1 wherein said indexing means comprise a pawl, ratchet, and cam follower, said follower being adjustable as to the stroke thereof.

6. A fixture for a machine tool as set forth in claim 1 wherein said indexing means comprise a pawl and ratchet and a brake to hold the work during movement of the pawl.

7. A fixture for a machine tool as set forth in claim 1 wherein means are provided for locking the work in position after indexing and comprising a plurality of coaxial gears with their teeth out of registry and fingers to engage each of the gears for locking the same in position.

8. A fixture for a machine tool as set forth in claim 1 wherein means are provided for locking the work in position after indexing and comprising a plurality of coaxial gears fixed on the work shaft with their teeth out of registry and a plurality of fingers one for each gear, to engage each of the gears for locking the same in position.

9. A fixture for a machine tool as set forth in claim 1 wherein a brake is provided to hold the work during indexing.

10. A fixture for a machine tool as set forth in claim 1 wherein means are provided for locking the work in position after indexing, and a brake is provided to hold the work during indexing.

11. A fixture for a machine tool as set forth in claim 1 wherein said indexing means comprise a pawl and ratchet, and means to adjust the movement of the pawl.

12. A fixture for a machine tool comprising a frame adapted to be detachably secured to a support, a work carrier slidably mounted on said frame, a drive shaft having bearings in said frames, a cam shaft having cams thereon driven by said drive shaft, a cam follower secured to a part attached to said carrier for engaging one of said cams to slide said carrier in one direction upon movement of said cam and resilient means to return said carrier for holding the follower in engagement with the cam, a mandrel for mounting the work rotatably supported by said carrier, a ratchet secured to said mandrel, a pawl movable about said mandrel for engaging said ratchet, a cam follower slidably mounted in said carrier and engageable with another cam when the carrier is at one end of its stroke for sliding said follower relative to said carrier and means responsive to said relative movement of said follower to actuate said pawl, means to adjustably limit the movement of said follower, whereby to adjust the throw of said pawl, means actuated by means to move said pawl to apply a brake to said mandrel, a pair of gears positioned coaxially with the teeth of one registering with the spaces between the teeth of the other, a pair of blocks fixed to said mandrel, each having fingers, one for each gear, to enter the spaces between said gear teeth and lock the mandrel in place, and means responsive to the movement of said carrier toward said cam shaft to withdraw said fingers from locking position.

EDWARD E. POWELL.

REFERENCES CITED

The following references are of record in the file of this patent:

UNITED STATES PATENTS

| Number | Name | Date |
|---|---|---|
| 607,629 | Reece | July 19, 1898 |
| 936,915 | Kustner | Oct. 12, 1909 |
| 1,533,165 | Cross | Apr. 14, 1925 |
| 1,621,145 | Weber | Mar. 15, 1927 |
| 1,827,965 | Anthony | Oct. 20, 1931 |
| 1,831,869 | Kessler | Nov. 17, 1931 |
| 2,187,544 | Saessher | Jan. 16, 1940 |
| 2,261,052 | Coffin et al. | Oct. 28, 1941 |
| 2,359,601 | Andrews et al. | Oct. 3, 1944 |